May 5, 1931.    J. E. WHITTLESEY    1,804,043
LAMINATED INSULATING STRUCTURE
Filed Dec. 28, 1929
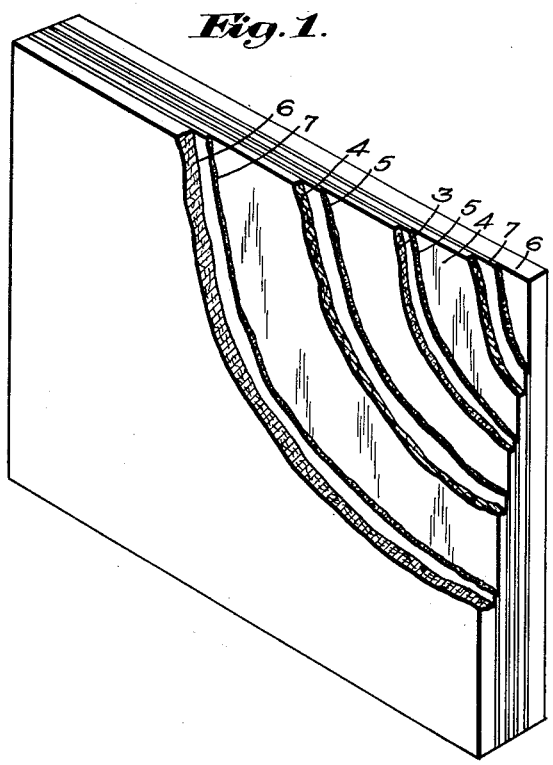
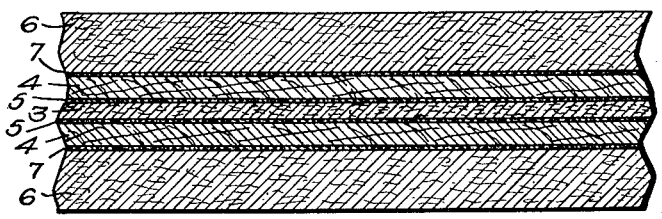
Inventor:
John E. Whittlesey,
by Emery, Booth, Varney & Townsend
Attys.

Patented May 5, 1931

1,804,043

UNITED STATES PATENT OFFICE

JOHN E. WHITTLESEY, OF NEWTON, MASSACHUSETTS

LAMINATED INSULATING STRUCTURE

Application filed December 28, 1929. Serial No. 417,184.

This invention relates to a novel, laminated, insulating structure which is particularly useful as a door for a switch-board cell, and for other similar purposes in situations where short-circuits across the switch terminals produce an intense and highly destructive heat. The invention will be best understood by reference to the following description, when taken in connection with the accompanying drawings of one specific embodiment thereof, while its scope will be more particularly pointed out in the appended claim.

In the drawings:

Fig. 1 is a perspective view of a laminated structure exemplifying the invention; and Fig. 2 is a cross-sectional view of the same at an enlarged scale.

Referring to the drawings, and to the embodiment of the invention which is illustrated therein, there is shown a laminated structure comprising a sheet 3 of material having a high dielectric strength. The best material now known to me for this purpose is the well-known fiber-board which is commonly used for electrical insulation. One such insulating material is gray and another is red. This material not only has a high dielectric strength, but possesses other important qualities. It is practically non-absorbent, non-shatterable, light, and easily workable, it is available in large, thin sheets, and it has a high tensile strength, as well as a high shearing strength. Moreover, it has no definite grain, and is, therefore, equally strong in all directions.

As shown, this sheet is interposed between two sheets 4 of fibrous, grained material such as wood veneer,—mahogany veneer being the best now known to me, as it has an open, porous grain which bonds very readily with a waterproof, adhesive material such as casein glue, employed to unite the sheets 4 with the sheet 3. Layers 5 of this waterproof adhesive material are shown in Fig. 2, between the sheet 3 and the sheets 4. The sheet 3 being of a fibrous nature, also bonds very readily with the casein glue. The wood veneer, though light, has a fairly high tensile strength. It is desirable that the fibers of the two sheets shall extend in the same general direction.

Finally, there are two outer sheets 6 of fire-proof material, such as a homogeneous composition of asbestos and hydraulic cement, commonly known as "asbestos wood", united with the sheets 4 by layers 7 of casein glue which bonds very readily with the "asbestos wood". The stone-like nature of the "asbestos wood" renders the same highly resistant to heat. "Asbestos wood" alone, however, when subjected to intense heat, will crack and allow penetration of flame. When the complete, composite sheet is subjected to intense heat for a considerable period of time, the wood veneer sheets become decomposed, and there are thus produced confined air spaces between the outer sheets of "asbestos wood". The composite sheet is, therefore, more highly resistant to the passage of heat or impinging flame than a solid sheet of the "asbestos wood" of a thickness equal to or greater than the thickness of the composite sheet. Tests of the composite sheet in comparison with an equal thickness of "asbestos wood" by the use of the flame of a torch have shown that, while the flame will penetrate the "asbestos wood" after a certain exposure, the composite sheet will not be penetrated. The "asbestos wood" on the opposite side of the sheet feels scarcely warm after an exposure of twenty minutes, and remains intact even after the "asbestos wood" on the other face and the intermediate sheets of wood veneer have become disintegrated.

"Asbestos wood" alone has little tensile and shearing strength, and is capable of absorbing considerable moisture, but, in the composite sheet, the waterproof glue resists the penetration of moisture beyond the surface layers, the composite sheet as a whole will not warp like a homogeneous sheet of equal thickness, it has a high tensile and shearing strength, a high dielectric strength, and it is highly resistant to the penetration of even the most intense flame of an electric arc, or of a torch.

The composite body has been shown and described in its simplest form, but it should, of course, be understood that the number of sheets of the various materials entering into it may be increased at will, and that the form of the body may be varied from that which is shown.

In the manufacture of the body, the several laminations are assembled in the required order, one upon the other, with layers of the waterproof glue between them, and the entire mass is subjected to a high pressure. Considerable pressure is essential to a proper and complete bonding of the several sheets with the layers of waterproof glue.

While the homogeneous "asbestos wood", in and of itself, has a definite resistance to the passage of electricity, the interposition of the fibrous sheet of higher dielectric strength in the middle of the composite sheet constitutes an improvement in this characteristic, and the body is, therefore, well adapted for doors of switch-board cells. The moisture-resisting properties of the body render the same highly desirable for use in situations where moisture is likely to accumulate, as in basements, tunnels and other underground places, and in various situations where moisture would impair other materials used for switch-board cell doors.

Having thus described one embodiment of the invention, but without limiting myself thereto, what I claim and desire by Letters Patent to secure is:

An insulating, laminated structure comprising, in combination, two outer sheets, each comprising a body of asbestos and hydraulic cement; a core between said sheets, said core comprising a central sheet of fibrous material of high dielectric strength and having no definite grain, two sheets of fibrous, grained material on opposite sides, respectively, of said central sheet, and layers of waterproof, adhesive material uniting said two sheets with said central sheet; and layers of waterproof, adhesive material uniting said core with said outer sheets.

In testimony whereof, I have signed my name to this specification.

JOHN E. WHITTLESEY.

CERTIFICATE OF CORRECTION.

Patent No. 1,804,043.   Granted May 5, 1931, to

JOHN E. WHITTLESEY.

It is hereby certified that the above numbered patent was erroneously issued to the inventor said "Whittlesey", as sole owner of said invention, whereas said patent should have been issued to the inventor said Whittlesey and Loren W. Marsh, of Arlington, Mass., jointly, as shown by the records of assignments in this office; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.